United States Patent
Ryu et al.

(10) Patent No.: US 11,881,805 B2
(45) Date of Patent: Jan. 23, 2024

(54) INTERFACE CIRCUIT OF MOTOR DRIVING APPARATUS

(71) Applicant: LS ELECTRIC CO., LTD., Anyang-si (KR)

(72) Inventors: Hyun Gyu Ryu, Anyang-si (KR); Chun Suk Yang, Anyang-si (KR); Jong Wook Jeon, Anyang-si (KR); Min Hun Chi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 200 days.

(21) Appl. No.: 17/432,754

(22) PCT Filed: Jul. 11, 2019

(86) PCT No.: PCT/KR2019/008552
§ 371 (c)(1),
(2) Date: Aug. 20, 2021

(87) PCT Pub. No.: WO2020/171309
PCT Pub. Date: Aug. 27, 2020

(65) Prior Publication Data
US 2022/0149769 A1    May 12, 2022

(30) Foreign Application Priority Data
Feb. 22, 2019   (KR) .................... 10-2019-0020841

(51) Int. Cl.
*H02P 31/00*   (2006.01)
*H02P 29/60*   (2016.01)

(52) U.S. Cl.
CPC .............. *H02P 31/00* (2013.01); *H02P 29/60* (2016.02)

(58) Field of Classification Search
CPC .......... H02P 31/00; H02P 29/60; H02P 25/16; H02P 27/06; H02P 3/18; H05K 7/20909
(Continued)

(56) References Cited

U.S. PATENT DOCUMENTS

2013/0169200 A1   7/2013   Zhao
2015/0077955 A1   3/2015   Tio et al.
(Continued)

FOREIGN PATENT DOCUMENTS

EP   2903150 A      8/2015
EP   2903150 A1 *   8/2015   .............. H02P 27/06
(Continued)

OTHER PUBLICATIONS

Al et al. (CN 102801384 A), Sensing Motor Variable Frequency Speed Adjusting System Based on DSP (Year: 2012).*
(Continued)

*Primary Examiner* — Jorge L Carrasquillo
(74) *Attorney, Agent, or Firm* — K&L Gates LLP

(57) ABSTRACT

The present disclosure relates to an interface circuit of a motor driving apparatus, the interface circuit comprising a power circuit unit for controlling driving of a motor, and a control panel unit which controls the power circuit unit and provides a user interface, wherein the power circuit unit further comprises a second MCU which controls a relay and an additional device unit and detects an operation state of the additional device unit, and the second MCU can communicate with a first MCU of the control panel unit via a communication line.

9 Claims, 4 Drawing Sheets

(58) Field of Classification Search
USPC .......................................................... 318/445
See application file for complete search history.

(56) References Cited

U.S. PATENT DOCUMENTS

2018/0048250 A1    2/2018  Zhao et al.
2018/0226911 A1*  8/2018  Yagi ........................ H02P 29/68

FOREIGN PATENT DOCUMENTS

| EP | 3367559 A1 * | 8/2018 | .............. H02P 27/06 |
| EP | 3367559 A1 | 8/2018 | |
| KR | 20100038162 A | 4/2010 | |
| KR | 20110092717 A | 8/2011 | |

OTHER PUBLICATIONS

International Search Report for related International Application No. PCT/KR2019/008552 report dated Aug. 27, 2020; (5 pages).
Written Opinion for related International Application No. PCT/KR2019/008552 report dated Aug. 27, 2020; (5 pages).
Extended European Search Report for related European application No. 19916289.2; action dated Oct. 6, 2022; (16 pages).

* cited by examiner

INTERFACE CIRCUIT OF MOTOR DRIVING APPARATUS

CROSS-REFERENCE TO RELATED APPLICATIONS

The present application is a National Stage of International Application No. PCT/KR2019/008552 filed on Jul. 11, 2019, which claims the benefit of Korean Patent Application No. 10-2019-0020841, filed on Feb. 22, 2019, with the Korean Intellectual Property Office, the entire contents of each hereby incorporated by reference.

FIELD

The present disclosure relates to an interface circuit of a motor driving apparatus, and more specifically to an interface circuit of a motor driving apparatus capable of simplifying the structure and reducing costs.

BACKGROUND

In general, a motor driving apparatus includes a power circuit unit for providing driving power to a motor and a control panel for detecting and displaying the operation state of the power circuit unit, and controlling the power circuit unit to comply with a control command which is input through a user interface.

As such, devices that use high power and have parts that are in direct contact with the user must have insulation measures for the safety of the user.

In particular, the Underwriters Laboratories (UL) standards stipulate the insulation grade for the user interface and power circuit part of an inverter, and the products that meet these standards are being produced.

FIG. 1 is an interface circuit diagram of a conventional motor driving apparatus.

Referring to FIG. 1, the interface circuit of a conventional motor driving apparatus is configured by including a power circuit unit 200, a control panel unit 100 and a digital isolator 300 that performs digital insulation on all signals transmitted between the power circuit unit 200 and the control panel unit 100.

The power circuit unit 200 includes circuits for driving a motor 207, for example, a power supply unit 201, a converter unit 202, an inrush current suppression unit 203, a smoothing unit 204, a regenerative braking unit 205, and an inverter unit 206.

In addition, it includes a gate driving unit 210 and various sensors 220 for driving individual gate elements of an inverter unit 206, and also includes relays 240 and additional device units 230.

The control panel unit 100 is configured by including a user interface unit 110 that the user directly contacts, and an MCU 120 that controls the power circuit unit 200 according to the input of the user interface unit 110 and detects the operation state of the power circuit unit 200 to display the same on the user interface unit 110.

The configuration and operation of each of the converter unit 202, the inrush current suppression unit 203, the smoothing unit 204, the regenerative braking unit 205 and the inverter unit 206 of the power circuit unit 200 are generally known, and thus, detailed descriptions thereof will be omitted.

The power circuit unit 200 includes a gate driving unit 210 as a basic circuit configuration for driving the motor 207, and may drive a plurality of gate elements provided in the inverter unit 206.

Besides, additional device units 230 that operate under the control of the MCU 120 are included. Examples of the additional device units 230 may include a plurality of cooling fans, an air circulation device including a blower, environmental monitoring devices such as a temperature sensor, a humidity sensor and the like.

As such, various functional blocks of the power circuit unit 200 operate under the control of the control panel unit 100.

The control panel unit 100 includes various sensors to determine the operation state of the power circuit unit 200 and display the same on the user interface unit 110.

Insulation is required for the signals of various sensors, and the digital isolator 300 is used for insulation, which is expensive and requires a relatively large installation area.

FIG. 2 is a simple block configurational diagram of a digital isolator.

The digital isolator 300 includes a plurality of photocouplers, and in particular, for bidirectional insulation between the power circuit unit 200 and the MCU 120, since it is necessary to use a bidirectional photocoupler 310 having a pair of light emitting units 311, 314 and light receiving units 312, 313 on one side, respectively, there has been a problem in that the cost and installation area increase.

In particular, since the terminal of the digital isolator 300 must be provided for each additional device unit 230 that is not closely related to the driving control of the motor 207, there has been a problem in that an increase in cost and an increase in volume are inevitable.

SUMMARY

The technical problem to be solved by the present disclosure is to provide an interface circuit of a motor driving apparatus capable of reducing the manufacturing cost and improving the tolerance of installation space.

The present disclosure for solving the above technical problem provides an interface circuit of a motor driving apparatus, the interface circuit including a power circuit unit for controlling driving of a motor, and a control panel unit which controls the power circuit unit and provides a user interface, wherein the power circuit unit further includes a second MCU which controls a relay and an additional device unit and detects an operation state of the additional device unit, and the second MCU can communicate with a first MCU of the control panel unit via a communication line.

In an exemplary embodiment of the present disclosure, it may further include a digital isolator provided in the first MCU and the power circuit unit to insulate a transmission/reception signal between gate driving units controlling the gate elements of an inverter unit.

In an exemplary embodiment of the present disclosure, the digital isolator may insulate a signal of a sensor unit detecting an operation state of the motor and provide the same to the first MCU.

In an exemplary embodiment of the present disclosure, the second MCU may be configured to turn on/off the gate elements of an inverter unit in accordance with a control signal of the first MCU.

In an exemplary embodiment of the present disclosure, the additional device unit may include a cooling fan, a blower or an environmental sensor.

In an exemplary embodiment of the present disclosure, after the priority of each of the additional device units is set, the second MCU may communicate with the first MCU according to the priority.

In an exemplary embodiment of the present disclosure, the second MCU may communicate with the first MCU only when there is a change in the detection result of the additional device unit.

In an exemplary embodiment of the present disclosure, the second MCU may block the relay in accordance with the detection result of the additional device unit.

By placing a separate MCU communicating with the MCU of a control panel unit in a power circuit unit and performing control by using mutual data communications, the present disclosure can reduce costs by limiting the use of a digital isolator, and it has an effect of securing a tolerance of installation space.

EXPLANATION OF REFERENCE NUMERALS

| | |
|---|---|
| 10: Control panel unit | 11: User interface unit |
| 12: First MCU | 13: Communication line |
| 20: Power circuit unit | 30: Digital isolator |
| 40: Relay | 50: Additional device unit |
| 60: Second MCU | |

DETAILED DESCRIPTION

In order to fully understand the configuration and effects of the present disclosure, preferred exemplary embodiments of the present disclosure will be described with reference to the accompanying drawings. However, the present disclosure is not limited to the exemplary embodiments disclosed below, and may be embodied in various forms and various modifications may be made. Simply, the description of the present exemplary embodiments is provided such that the disclosure of the present disclosure is complete, and to fully inform the scope of the disclosure to those of ordinary skill in the art to which the present disclosure pertains. In the accompanying drawings, components are enlarged in size compared to the reality for convenience of description, and the ratio of each component may be exaggerated or reduced.

Terms such as 'first' and 'second' may be used to describe various components, but the above components should not be limited by the above terms. The above terms may only be used for the purpose of distinguishing one component from another. For example, without departing from the scope of the present disclosure, a 'first component' may be referred to as a 'second component', and similarly, a 'second component' may also be referred to as a 'first component.' In addition, the singular expression includes the plural expression unless the context clearly dictates otherwise. Unless defined otherwise, terms used in the exemplary embodiments of the present disclosure may be interpreted as meanings commonly known to those of ordinary skill in the art.

Hereinafter, an inverter protection device according to an exemplary embodiment of the present disclosure will be described with reference to the drawings.

Figure 1:
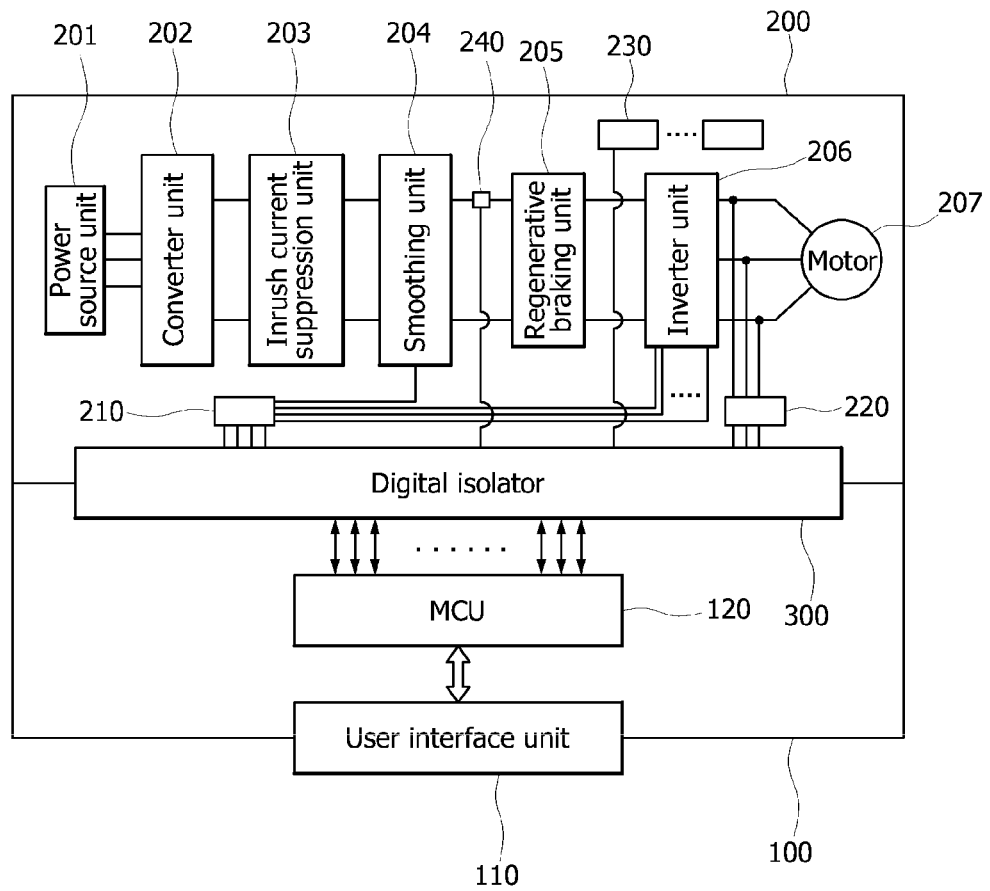
FIG. 1 is an interface circuit diagram of a conventional motor driving apparatus.
Figure 2:
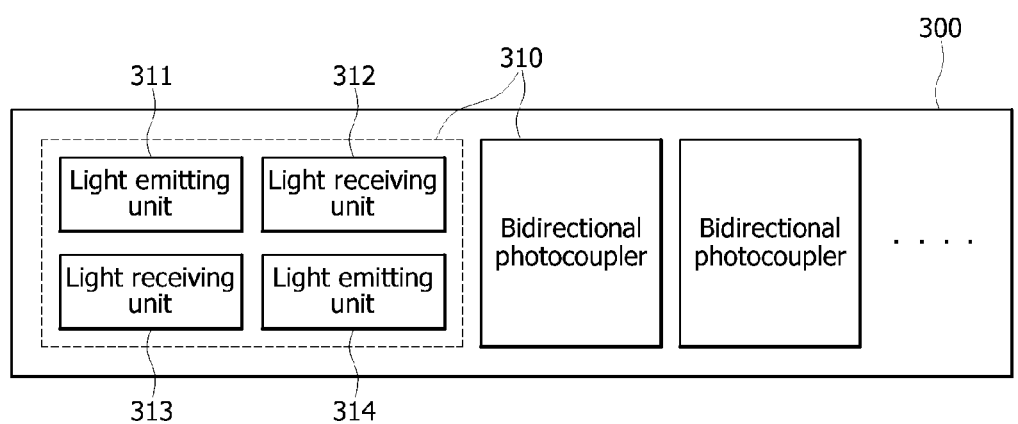
FIG. 2 is a block configurational diagram of a digital isolator in FIG. 1.
Figure 3:
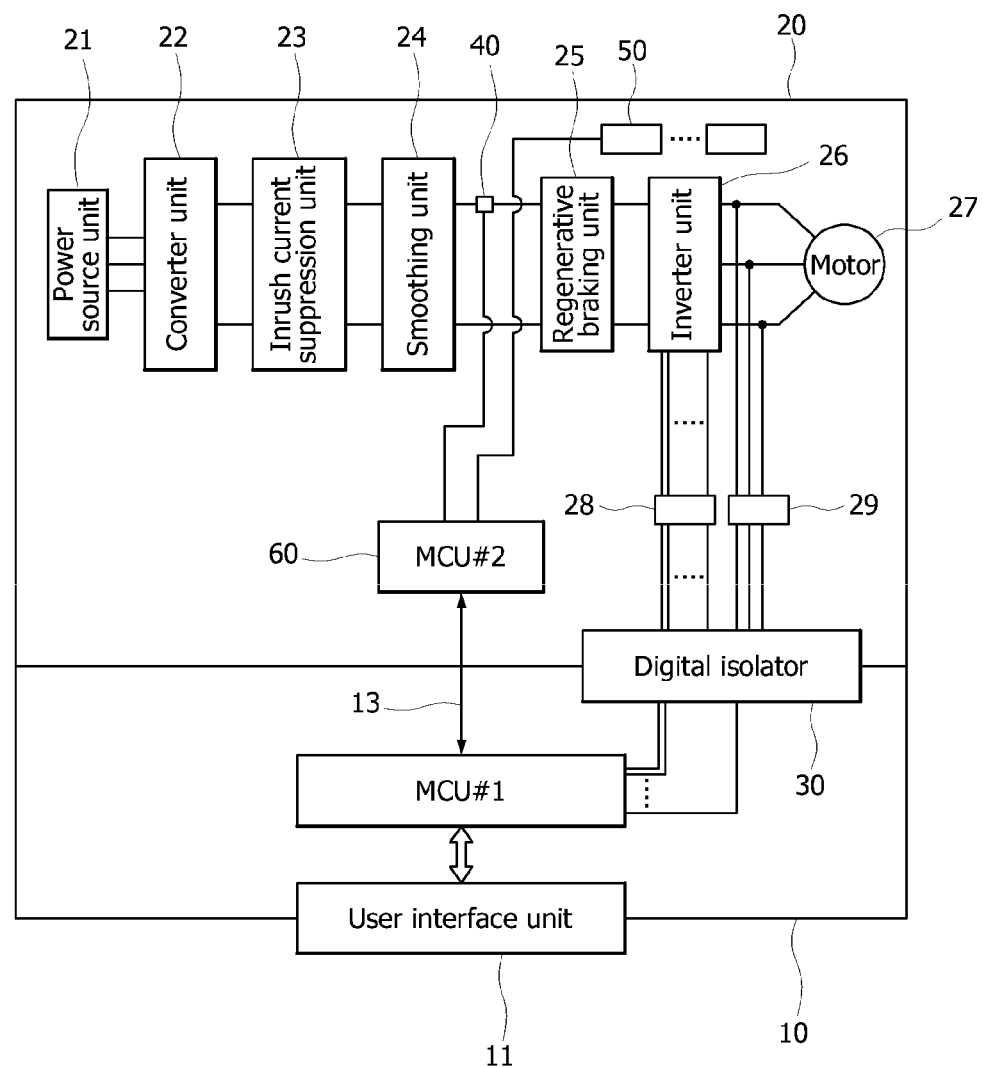
FIGS. 3 and 4 are each an interface circuit diagram of a motor driving apparatus according to an exemplary embodiment of the present disclosure.

FIG. 3 is an interface circuit diagram of a motor driving apparatus according to an exemplary embodiment of the present disclosure.

As illustrated in the drawing, the interface circuit of a motor driving apparatus according to an exemplary embodiment of the present disclosure includes a power circuit unit 20 for driving a motor 27 and a control panel unit 10 for controlling the power circuit unit 20, and also includes a second MCU 60 that communicates with a first micro controller unit (MCU) 12 of the control panel unit 10 in the power circuit unit 20 to monitor and control the state of a relay 40 and an additional device unit 50.

The digital isolator 30 insulates signals mutually transmitted between the power circuit unit 20 and the control panel unit 10 without passing through the second MCU 60.

The power circuit unit 20 may include circuits for driving the motor 27, for example, a power supply unit 21, a converter unit 22, an inrush current suppression unit 23, a smoothing unit 24, a regenerative braking unit 25, and an inverter unit 26.

Herein, the circuits for driving the motor 27 listed above are an example, and the circuit configuration may be changed as needed.

In addition, the power circuit unit 20 includes a gate driving unit 28 and a sensor unit 29, and the gate driving unit 28 controls gate elements provided in the inverter unit 26, and the sensor unit 29 detects the driving current of the motor 27 and provides the operation state of the motor 27.

The control panel unit 10 displays such that the user may recognize the operation state of the power circuit unit 20 including the operating state of the motor 27, and it may control a user interface unit 11 that can receive the user's control command and a gate driving unit 28 via the digital isolator 30, and include a first MCU 12 for receiving the signal of a sensor unit 29 and a communication line 13 for data transmission between the first MCU 12 and the second MCU 60 of the power circuit unit 20.

In such configuration, if there is an operation command via the user interface unit 11, the first MCU 12 outputs various control signals according to the settings. In this case, the control signal for controlling the relay 40 and the control signal for controlling the additional device unit 50 are transmitted to the second MCU 60 of the power circuit unit 20 via the communication line 13.

The communication line 13 is determined according to the communication method between the first MCU 12 and the second MCU 60, and a serial or parallel communication line may be used.

The second MCU 60 receiving the control signal of the first MCU 12 controls and drives the relay 40 and the additional device units 50.

In addition, the control signal of the first MCU 12 for controlling the inverter unit 26 is provided to the gate driving unit 28 via the digital isolator 30, and the gate driving unit 28 drives the motor 27 by controlling the control state of the gate elements provided in the inverter unit 26.

In this case, the driving control of the motor 27 may be a rotation direction and speed.

Such an operation state of the motor 27 is detected by the sensor unit 29. The operation state detected by the sensor unit 29 is received by the first MCU 12 via the digital isolator 30, and the first MCU 12 displays the operation state of the motor 27 on the user interface unit 11 for the user to recognize the same.

The digital isolator 30 includes photocouplers, and since insulation is performed only on limited signals that are transmission/reception signals between the sensor unit 29, which detects the operation of the gate driving unit 28 and the motor 27, and the first MCU 12, the number of photocouplers may be reduced, and the cost and volume may be reduced by reducing the quantity of photocouplers, which have a large price difference depending on the insulation level.

During the operation of the motor 27, the state of the additional device unit 50 is detected by the second MCU 60.

Specifically, the additional device unit 50 may be an air circulation device such as a cooling fan, a blower or the like, and in this case, the rotation speed of the cooling fan and the blower is detected by the second MCU 60.

In this case, the detected information is transmitted to the first MCU 12 via the communication line 13, and the first MCU 12 may display the rotation speed of the cooling fan and the blower on the user interface unit 11.

The present disclosure is characterized in that control and information detection are possible in a communication method that does not require insulation from the first MCU 12 by further including the second MCU 60, and the amount of data communications via the communication line 13 may be increased. In order to prevent this, the second MCU 60 may be set to transmit information to the first MCU 12 via the communication line 13 only when there is a change in the state of the relay 40 or the additional device unit 50.

For example, if the second MCU 60 detects that the rotation speed of the cooling fan, which is an additional device unit 50, has rapidly decreased, it is determined that a fault has occurred in the cooling fan, which is an additional device unit 50, and it is transmitted to the first MCU 12 via the communication line 13 and displayed on the user interface unit 11 such that an action may be taken.

The interface unit 11 includes an alarm function, and may generate an alarm when it is determined that an abnormality has occurred.

Another predictable effect of the present disclosure is that a faster control response speed may be expected by using a method of parallelizing control by communications between the first MCU 12 and the second MCU 60, compared to insulating all transmission/reception data of the conventional control panel unit MCU.

For example, the temperature information detected by the additional device unit 50, which is a temperature sensor, is detected by the second MCU 60, and it is possible for the second MCU 60 to control another additional device unit 50, which is a cooling fan, immediately according to the detected temperature.

While the second MCU 60, which detects that the temperature detected by a specific temperature sensor has risen sharply, transmits the detection result of an increase in temperature to the first MCU 12 of the control panel unit 10, this allows that a response control for overheating may be performed faster by controlling the rotation speed of another additional device unit 50, which is a cooling fan, in accordance with the temperature.

In addition, the second MCU 60 may set the communication priority. It is possible to set the importance for each of the additional device units 50 occupying in the entire system, and provide information detected by the additional device unit 50 with high importance to the first MCU 12 first compared to other information.

Through such priority processing, control processing delays due to possible communication congestion may be resolved.

In addition, the second MCU 60 may provide a shutdown function. For example, if it the information detected by a humidity sensor, a temperature sensor and the like, which are additional device units 50, determines that it may seriously damage the entire system, the control of opening a relay 40 may be performed immediately. Therefore, it is possible to respond more quickly in emergency situations and prevent damage to the system.

Figure 4:
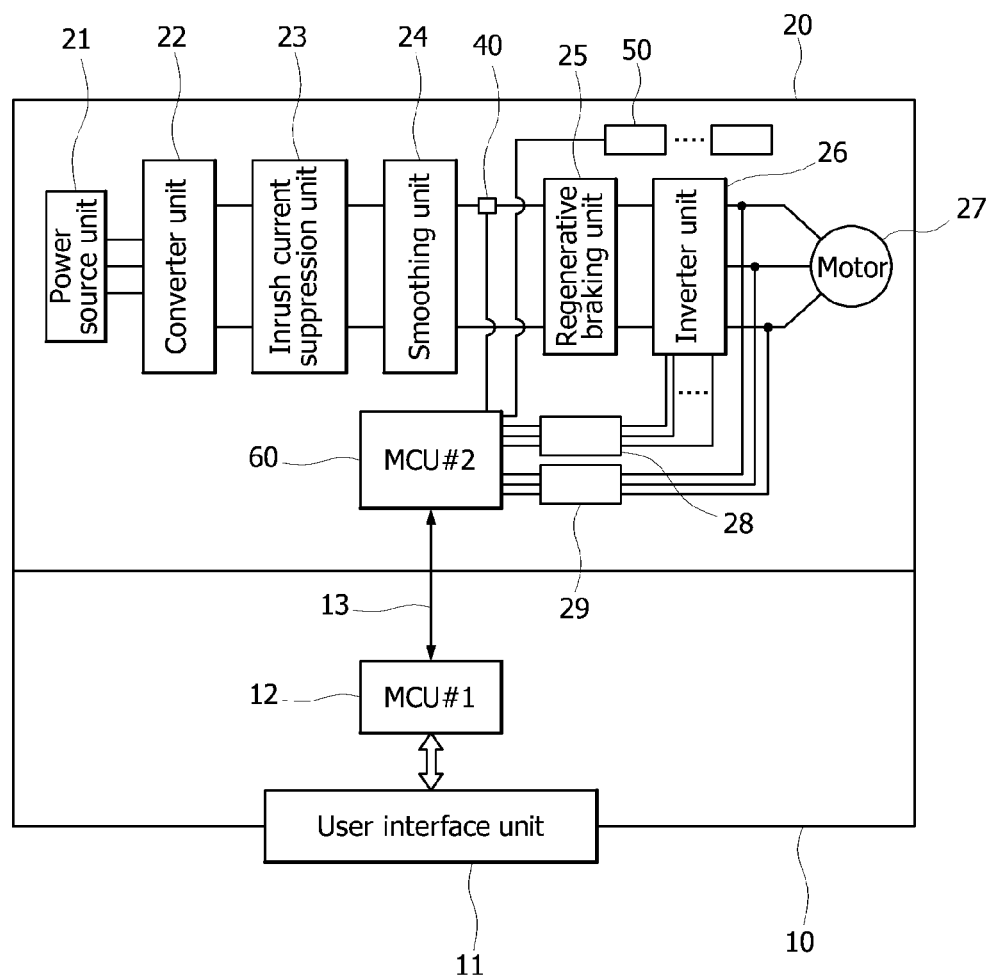

FIG. 4 is an interface circuit diagram of a motor driving apparatus according to another exemplary embodiment of the present disclosure.

Referring to FIG. 4, the interface circuit of a motor driving apparatus according to another exemplary embodiment of the present disclosure may replace the transmission and reception of all signals between the control panel unit 10 and the power circuit unit 20 with data communications between the first MCU 12 of the control panel unit 10 and the second MCU 60 of the power circuit unit 20.

Accordingly, without using a digital isolator 30, it is possible to achieve an insulating state.

In such configuration, the second MCU 60 may directly control the gate driving unit 28 to control the gate element of the inverter unit 26, and the driving state of the motor 27 detected by the sensor unit 29 may be received and determined.

In this case, the second MCU 60 may provide the information to the first MCU 12 only when the driving state of the motor 27 detected by the sensor unit 29 is changed. In addition, only when the control signal of the first MCU 12 that changes the driving control of the motor 27 is received, it may control the gate driving unit 28 to minimize an increase in the amount of communications via the communication line 13.

Although the exemplary embodiments according to the present disclosure have been described above, these are only exemplary, and those of ordinary skill in the art will understand that various modifications and exemplary embodiments of an equivalent range are possible therefrom. Therefore, the true technical protection scope of the present disclosure should be defined by the following claims.

The present disclosure has industrial applicability as a technology for simplifying the structure by changing the design of an interface for controlling a motor driving apparatus using the laws of nature.

The invention claimed is:

1. An interface circuit of a motor driving apparatus, the interface circuit comprising:
   a power circuit unit comprising:
      an inverter unit for controlling driving of a motor;
      a gate driving unit for controlling driving of a gate of the inverter unit;
      a relay;
      an additional device unit of a cooling fan or a blower for cooling the power circuit unit; and
      a second motor control unit (MCU) for controlling the relay and the additional device unit and detecting a state of the additional device unit;
   a control panel unit which is located separately from the power circuit unit and comprises a first MCU that receives a detected state of the relay and the additional device unit by directly communicating with the second MCU while controlling the gate driving unit; and
   a digital isolator for interfacing the power circuit unit and the control panel unit and that insulates a transmission/reception signal transmitted between the first MCU and the gate driving unit.

2. The interface circuit of claim 1, wherein the digital isolator insulates a signal of a sensor unit detecting an operation state of the motor and provides the same to the first MCU.

3. The interface circuit of claim 2, wherein the digital isolator is in direct communication between the first MCU and the gate driving unit, and wherein the digital isolator is in direct communication between the first MCU and the sensor unit.

4. The interface circuit of claim 1, wherein after the priority of each of the additional device units is set, the second MCU communicates with the first MCU according to the priority.

5. The interface circuit of claim 1, wherein the second MCU communicates with the first MCU only when there is a change in the detection result of the additional device unit.

6. The interface circuit of claim 1, wherein the second MCU blocks the relay in accordance with the detection result of the additional device unit.

7. The interface circuit of claim 1, wherein the first MCU is in direct communication with the second MCU.

8. The interface circuit of claim 1, wherein the digital isolator comprises a plurality of photocouplers.

9. The interface circuit of claim 1, wherein the digital isolator is not in direct communication with the second MCU.

* * * * *